C. F. WAY.
MANURE SPREADER AND LOADER.
APPLICATION FILED AUG. 24, 1910.
984,328.
Patented Feb. 14, 1911.
2 SHEETS—SHEET 2.
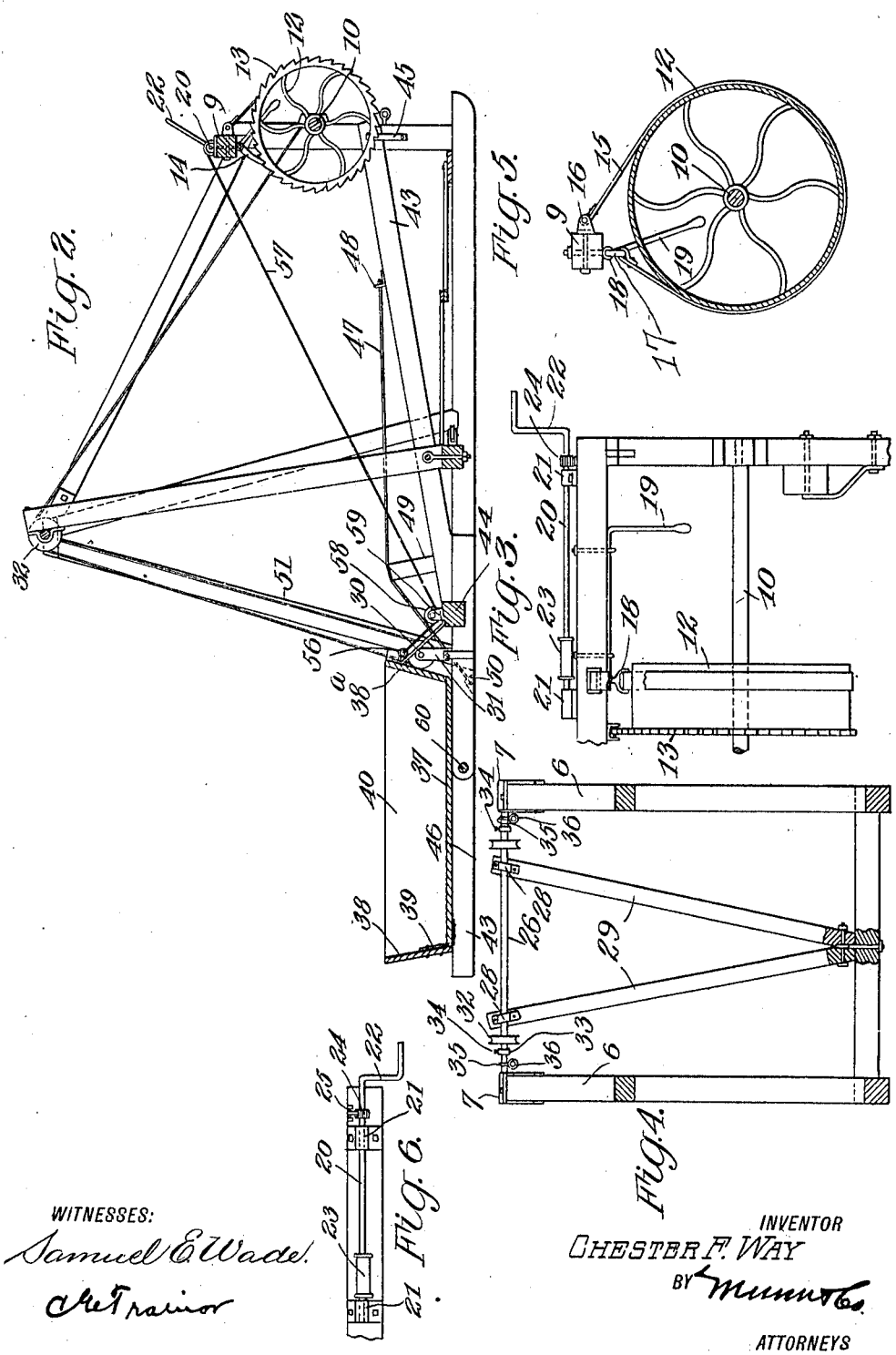
WITNESSES:
Samuel E. Wade
[signature]
INVENTOR
CHESTER F. WAY
BY [signature]
ATTORNEYS

UNITED STATES PATENT OFFICE.

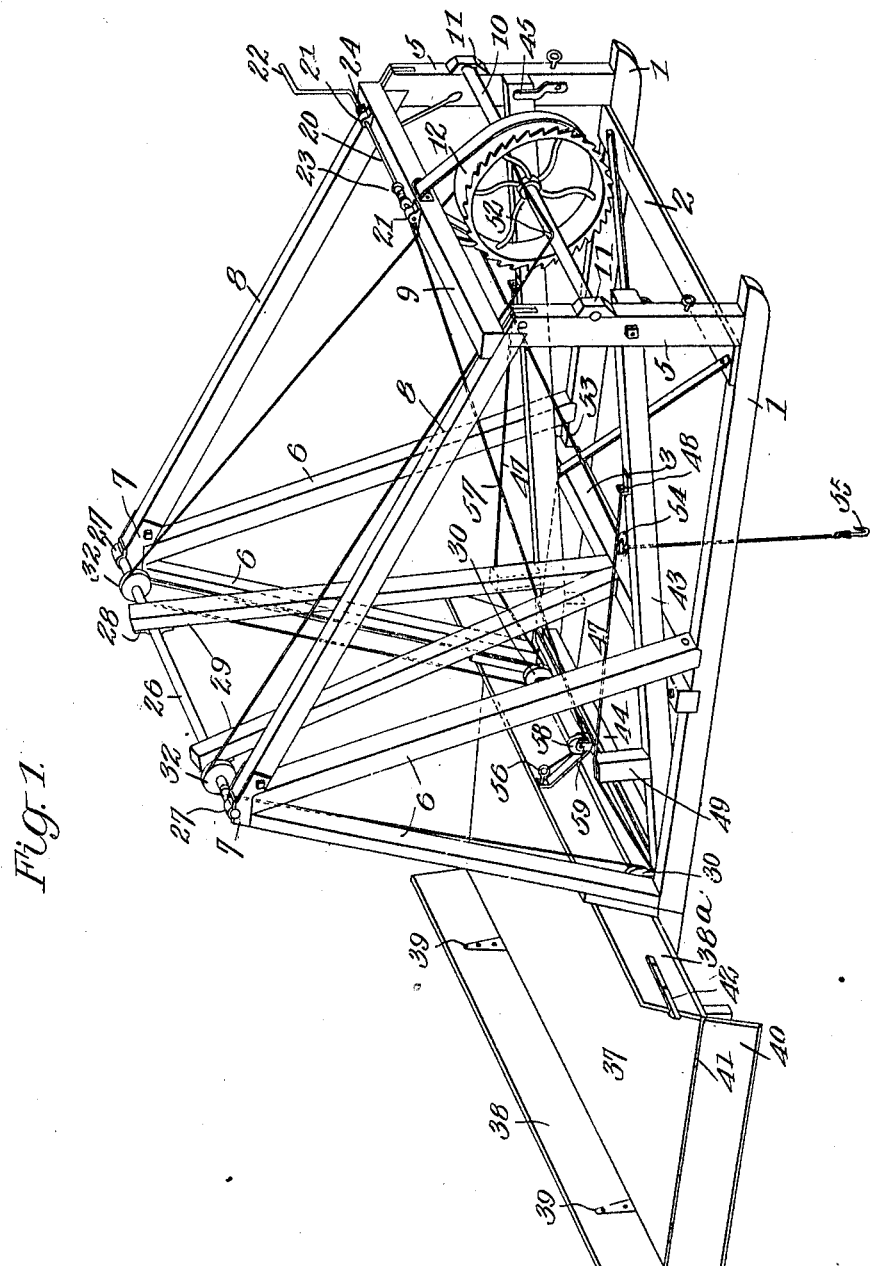

CHESTER FREMONT WAY, OF ELM CREEK, NEBRASKA.

MANURE SPREADER AND LOADER.

984,328.  Specification of Letters Patent.  Patented Feb. 14, 1911.

Application filed August 24, 1910. Serial No. 578,633.

*To all whom it may concern:*

Be it known that I, CHESTER FREMONT WAY, a citizen of the United States, and a resident of Elm Creek, in the county of Buffalo and State of Nebraska, have invented a new and useful Improvement in Manure Spreaders and Loaders, of which the following is a specification.

My invention is an improvement in manure spreaders and loaders, and consists in certain novel constructions, and combinations of parts, hereinafter described and claimed.

The object of the invention is to provide a simple and efficient device of the character specified, which may be easily operated, easily transported from place to place, and which will lift a large load with a small amount of power.

Referring to the drawings forming a part hereof, Figure 1 is a perspective view of the improvement. Fig. 2 is a vertical longitudinal section. Fig. 3 is a partial front view. Fig. 4 is a rear view of the bracing. Fig. 5 is a side view of the braking mechanism, and Fig. 6 is a plan view of the upper part of Fig. 3.

In the present embodiment of the invention a frame is provided, comprising a base composed of side bars 1, connected by cross bars 2 and 3, and at one end of each side bar an upright 5 is arranged. Near the opposite end of each side bar is arranged a pair of standards 6, the said standards inclining toward each other toward their upper ends, and having their upper ends connected at 7. Longitudinal bars 8 connects the upper end of each pair of standards with the upright 5 on the same side bar, and a cross bar 9 connects the bars 8 adjacent to the uprights 5. A shaft 10 is journaled transversely of the upright 5, in bearings 11, and a drum 12 is secured to the shaft at approximately the center thereof. At one edge of the periphery of the drum an annular series of ratchet teeth 13 is arranged, and a pawl 14 is pivoted to the cross bar, and engages the teeth to prevent rotation of the drum in one direction. A brake band 15 encircles the drum 12 and is secured at one end to a bracket 16 on the cross bar 9, and the other end of the band is connected to one arm 17 of an elbow lever pivoted at 18 to the cross bar. The opposite end of the lever forms a handle 19 for operating the band, to apply or release the brake.

A shaft 20 is journaled in bearings 21 on the cross bar 9, the outer end of the shaft being provided with a crank 22, and the inner end has secured thereto a reel 23. A ratchet wheel 24 is secured to the shaft near the crank, and a pawl 25 pivoted on the cross bar 9, coöperates with the wheel.

A shaft 26 is journaled in bearings 27 on the upper ends of the standards 6, and in bearings 28 in the upper ends of braces 29, the braces being arranged in inclined position and diverging from each other at their upper ends. At their lower ends the braces are secured to the cross bar 3, the said ends being arranged close together.

A platform is arranged at one end of the frame, the platform comprising a bottom 37, a fixed side 38ª adjacent to the frame, and a side 38 hinged at 39 to the bottom, and ends 40 hinged to the bottom at 41, and held in closed position by spring latches 42 on the sides. The platform is supported on bars 46, connected to the ends of arms 43, and the arms are connected by a cross bar 44 adjacent to the platform. At their opposite ends the arms rest in stirrups 45 on the uprights 5. A truss rod 47 is arranged on each side, being connected at one end with a bracket 48 on the arm, and at the other with a bar 46 at 50, each brace rod passing over a strut 49 on the arm.

A pulley 30 is journaled in a bracket 31 on each bar 46, and the shaft 26 is provided with a pulley 32, directly above each pulley 30. A rope 51 is arranged at the sides of the frame, the rope having its ends connected with rings 36 journaled at 35 on the shaft 26, one at each end thereof, and passing downward under the adjacent pulley 30, thence upward over the adjacent pulley 32 to the shaft 10, the central portion of the rope engaging pins 52 on the shaft.

It will be evident that when the shaft 10 is rotated by any suitable means, the platform will be lifted on the arms 43, and the said arms are free to move between the cross bar 3 and the shaft 26. The shaft is rotated by means of a rope 53, which winds on the drum at one end, and the other end of the rope passes rearwardly over a pulley 54, the free end having secured thereto a hook 55. One or more draft animals may be hitched to the hook, and when the platform is lifted, it is held in elevated position by the pawl. When the platform is being lowered, the brake is made use of to control the drum or wheel 12. An eye 56 is secured to the side 38ª of the platform, and a cable 57 has one end secured to the eye. The cable passes from the eye under a pulley 58, journaled in a bracket 59 on the cross bar 44 and winds on the reel 23 on the shaft 20. The cross bars 46 to which the platform is secured, are pivoted at 60 to the arms 43, and the pivotal connection is at one side of the longitudinal center of the platform, so that the platform would dump itself automatically, if not held in horizontal position by the cable 57. The cable 57 when the shaft 20 is released will permit the platform to tilt and dump its load, and the platform may be returned to horizontal position by turning the shaft.

In operation, the end doors 40 are lowered, and the platform is loaded, preferably by scrapers, which dump the material on the platform, the said scrapers passing over the same from end to end. When the platform is loaded, the end doors are lifted and held in place by the latches. The drum is then rotated and the platform is lifted, being held in horizontal position by the cable 57, the pawl preventing rotation of the shaft 20. When the platform has reached a suitable height, the brake is applied, and the load is held. A wagon being arranged alongside the platform, the pawl holding the shaft 20 is released and the platform is permitted to dump. After the load is dumped, the platform is returned to horizontal position by means of the shaft 20. The platform is then lowered by means of the brake, and the process is repeated. The hinged side 38 of the platform is lowered when the load is being dumped, and may be held in upright position by any suitable means.

I claim—

1. A machine of the character specified, comprising a base, spaced uprights at one end thereof, spaced standards at the opposite end, a stirrup on each upright, an arm at each side of the base and having one end resting in a stirrup, a platform connected with the opposite ends of the arms, and mounted for tilting movement on the arms, a shaft journaled between the uprights, a drum on the shaft provided at one edge with ratchet teeth, a pawl engaging the teeth, a brake engaging the drum for holding the same, a rope winding on the drum for turning the same, a pulley on the base under which the rope passes, a shaft journaled between the standards and provided near each end with a pulley, a pulley on each arm near the platform, a rope having its central portion connected with the drum shaft, the ends of said rope passing over the pulleys on the shafts on the standards and under the pulleys on the arms to a connection with the shaft on the standards, means for normally holding the platform horizontal, and means for releasing the said holding means.

2. A machine of the character specified, comprising a platform having hinged end doors and a hinged side door, latches for holding the doors closed, a frame adjacent to the platform, arms supported on the frame at one end and pivoted to the platform at the other end, the point of pivotal connection being between the platform and the frame, a shaft journaled on the frame, a connection between the shaft and the arms for lifting said arms, a drum on the shaft, means for rotating the drum, a shaft journaled on the frame, a connection between the shaft and the platform for holding said platform in horizontal position, releasable means for preventing rotation of the shaft, the drum having near one edge a plurality of ratchet teeth, a pawl on the frame engaging the teeth, a brake band encircling the drum, and means for tightening said band on the drum.

3. A machine of the character specified, comprising a platform having hinged end doors and a hinged side door, latches for holding the doors closed, a frame adjacent to the platform, arms supported on the frame at one end and pivoted to the platform at the other end, the point of pivotal connection being between the platform and the frame, a shaft journaled on the frame, a connection between the shaft and the arms for lifting said arms, a drum on the shaft, means for rotating the drum, a shaft journaled on the frame, a connection between the shaft and the platform for holding said platform in horizontal position, releasable means for preventing rotation of the shaft, means for preventing reverse rotation of the drum, and a brake in connection with the drum.

4. A machine of the character specified, comprising a platform having hinged end doors and a hinged side door, latches for holding the doors closed, a frame adjacent to the platform, arms supported on the frame at one end and pivoted to the platform at the other end, the point of pivotal connection being between the platform and the frame, a shaft journaled on the frame, a connection between the shaft and the arms for lifting said arms, a drum on the shaft, means for rotating the drum, a shaft journaled on the frame, a connection between the shaft and the platform for holding said platform in horizontal position, releasable means for preventing rotation of the shaft, and a brake in connection with the drum.

5. A machine of the character specified, comprising a platform having hinged end doors and a hinged side door, latches for holding the doors closed, a frame adjacent to the platform, arms supported on the frame at one end and pivoted to the platform at the other end, the point of pivotal connection being between the platform and the frame, a shaft journaled on the frame, a connection between the shaft and the arms for lifting said arms, a drum on the shaft, means for rotating the drum, a shaft journaled on the frame, a connection between the shaft and the platform for holding said platform in horizontal position, and releasable means for preventing rotation of the shaft.

6. A machine of the character specified, comprising a platform having hinged end doors and a hinged side door, latches for holding the doors closed, a frame adjacent to the platform, arms supported on the frame at one end and pivoted to the platform at the other end, the point of pivotal connection being between the platform and the frame, a shaft journaled on the frame, a connection between the shaft and the arms for lifting said arms, a drum on the shaft, means for rotating the drum, a brake for the drum, and releasable means for normally holding the platform in horizontal position.

7. A machine of the character specified, comprising a platform having hinged end doors and a hinged side door, latches for holding the doors closed, a frame adjacent to the platform, arms supported on the frame at one end and pivoted to the platform at the other end, the point of pivotal connection being between the platform and the frame, a shaft journaled on the frame, a connection between the shaft and the arms for lifting said arms, a drum on the shaft, means for rotating the drum, and a brake for the drum.

8. A machine of the character specified, comprising a platform having hinged end doors and a hinged side door, latches for holding the doors closed, a frame adjacent to the platform, arms supported on the frame at one end and pivoted to the platform at the other end, the point of pivotal connection being between the platform and the frame, a shaft journaled on the frame, a connection between the shaft and the arms for lifting said arms, a drum on the shaft, and means for rotating the drum.

CHESTER FREMONT WAY.

Witnesses:
W. N. GARRISON,
LEE ARMSTRONG.